FIG. 8
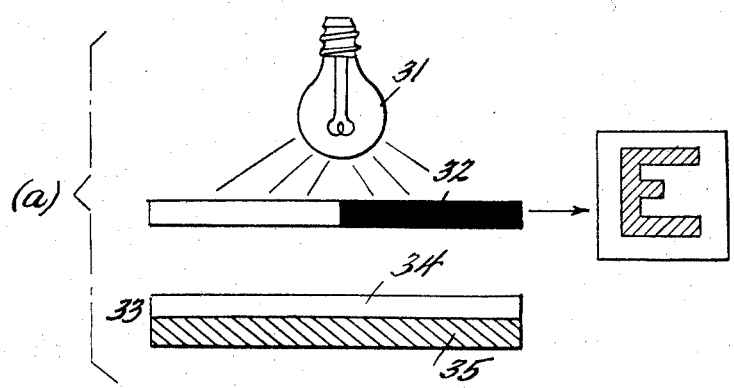
(a)
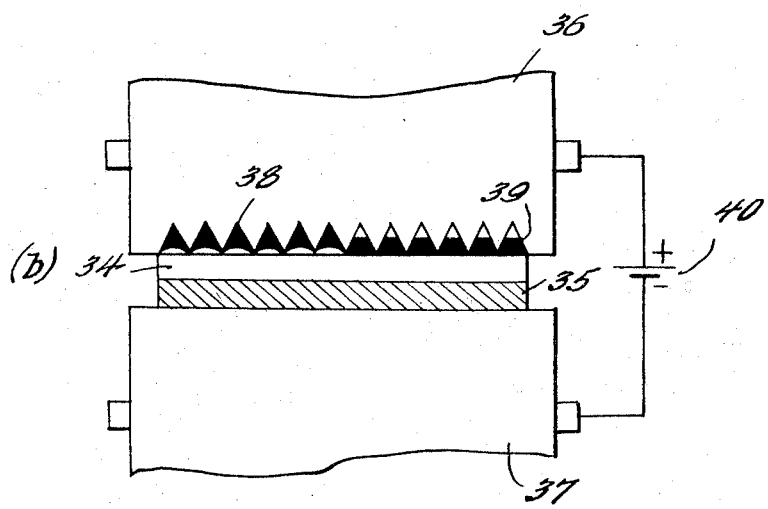
(b)
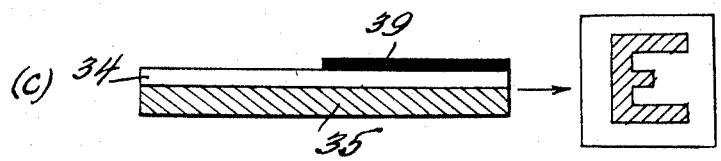
(c)

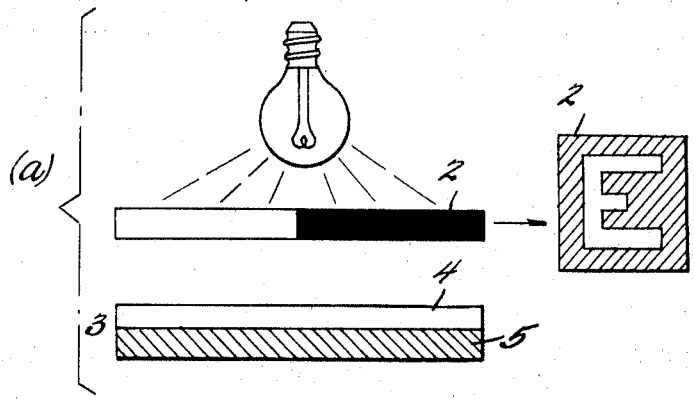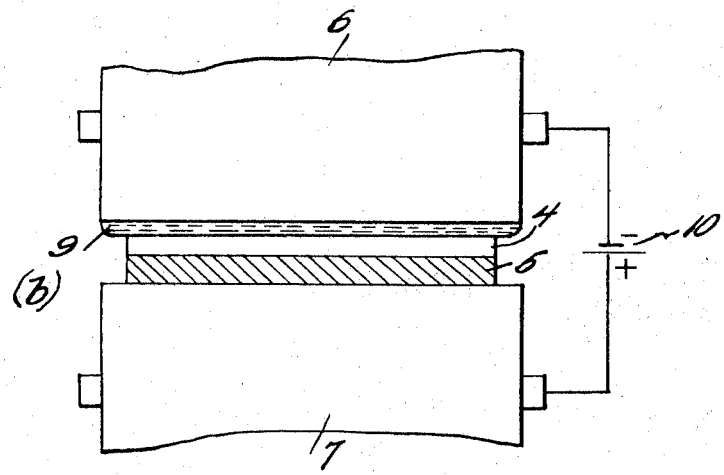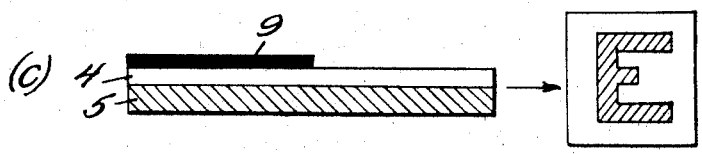

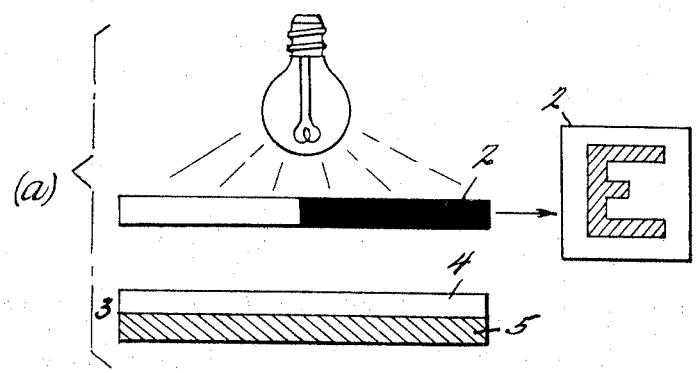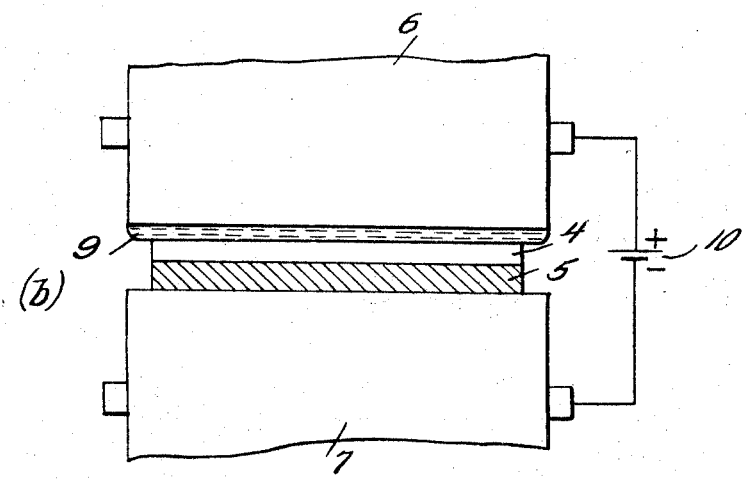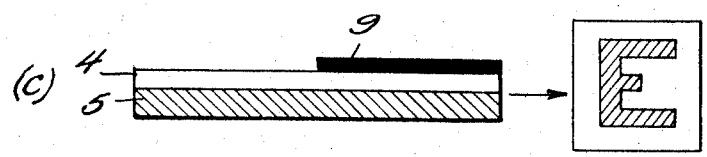

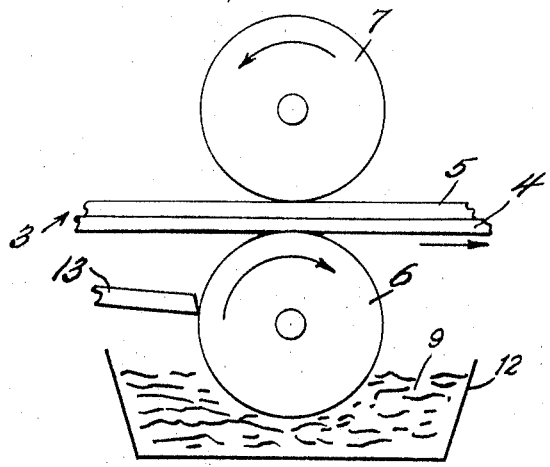
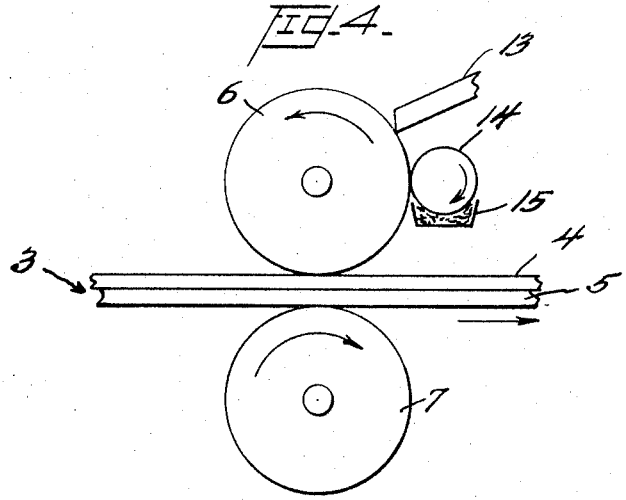

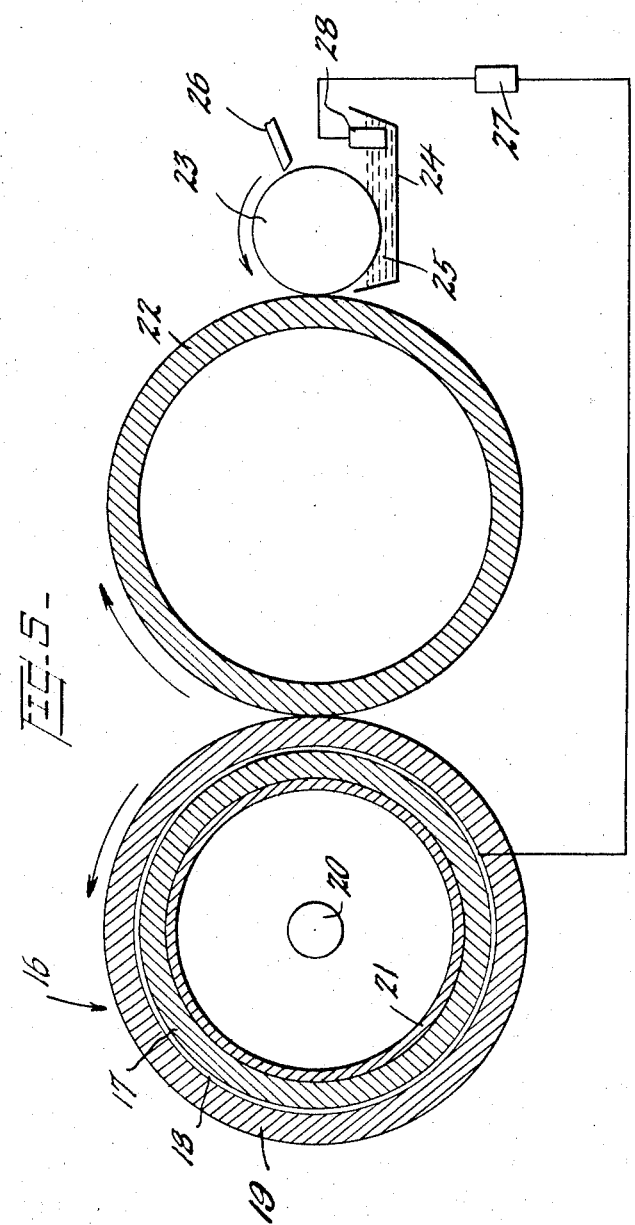

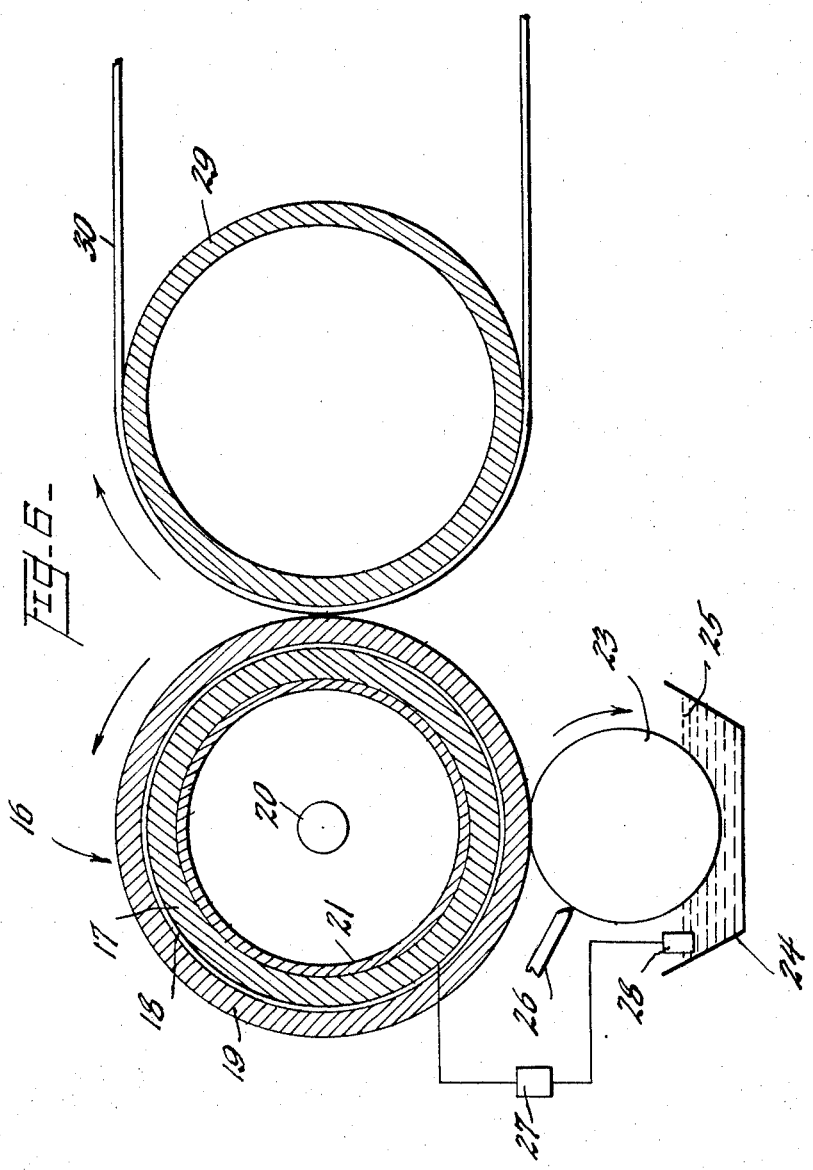

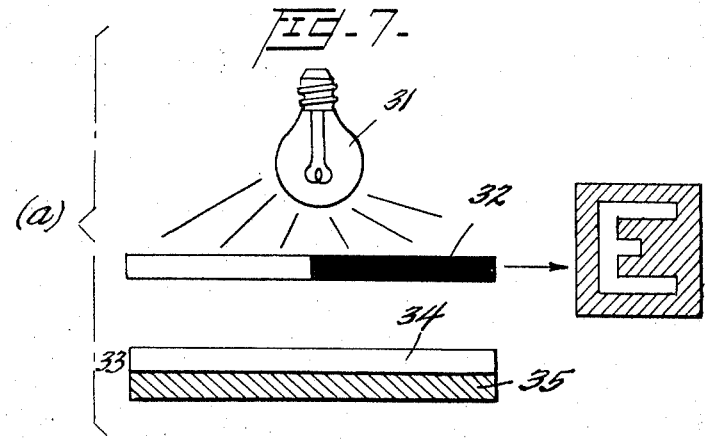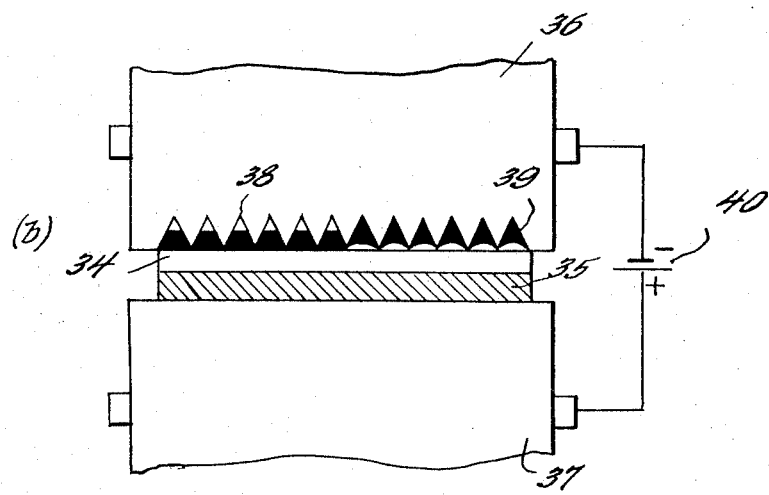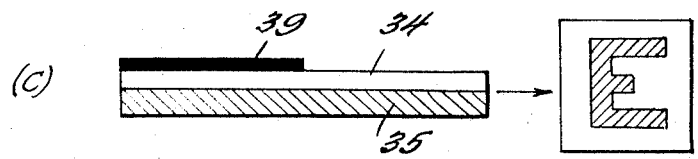

3,425,829
ELECTROPHOTOGRAPHIC RECORDING PROCESS
Paul Maria Cassiers, Mortsel, Jozef Leonard Van Engeland, St. Katelijne-Waver, and Robert Joseph Noe, Mortsel, Belgium, assignors to Gevaert-Agfa N.V., Mortsel, Belgium, a Belgian company
Original application Nov. 26, 1962, Ser. No. 240,108, now Patent No. 3,383,209, dated May 14, 1968. Divided and this application May 23, 1967, Ser. No. 640,603
Claims priority, application Netherlands, Nov. 27, 1961, 271,851
U.S. Cl. 96—1
Int. Cl. G03g 13/10
10 Claims

ABSTRACT OF THE DISCLOSURE

A process of reproduction in which a latent photoconductive image is produced by means of a light pattern in a normally hydrophobic photoconductive layer of an electrophotographic material also having an electrically conductive backing, and is developed with an aqueous conductive developing liquid normally repelled by layer surface, the developing liquid being in at least one capillary channel in a dispensing member brought into close proximity with the layer surface, which channel has walls normally wet by the developing liquid and thus holds the liquid substantially out of contact with the layer surface by capillary forces, the capillary forces and the normal repellency of the layer surface being overcome in the unexposed areas of the layer by passing through the layer while proximate to the dispensing member an electric field of sufficient intensity and duration extending between the conductive backing and the conductive developing liquid at least simultaneously with the formation of the latent image and before the latent image decays.

---

This application is a division of U.S. application Ser. No. 240,108, filed Nov. 26, 1962, now Patent No. 3,383,209.

This invention relates to new processes of recording patterns of light and other radiation. The processes are suitable for use in document copying.

It is well known that light-images can be recorded by projecting the image onto a photoconductive layer and utilising the characteristic photoconductive property of such a layer to bring about the formation of an electrostatic image in the photoconductive layer or in another layer either simultaneously with the exposure to the light-image or subsequently. This principle is made use of in the well known electrophotographic processes of document copying in which the electrostatic image so produced is subsequently developed by means of an electrostatically attractable developer material. This material is normally a powder but development by means of liquid supplied in atomised form as a mist has been proposed.

Another known method of recording a light-image projected onto a photoconductive layer is the so-called electrolytic development technique. This technique involves the generation of an electric field across the exposed photoconductor and a contacting solution of electrolyte to cause electrodeposition of metal ions and is theoretically quite simple but its dependence on the use of electrolytes and rather high electric current intensities for development, and the inevitable production of reversal prints rather than direct positives when used for document copying, make electrolytic development of somewhat limited potential use.

In U.S. patent application No. 150,820, now abandoned, we have described methods of recording light and other radiation patterns by means of liquid. These methods are based on the discovery that electrostatic charges in or on a support can influence the interfacial tension between its surface and an appropriately chosen liquid medium so that the liquid exhibits a wetting power in respect of the surface when an electrostatic charge is present but not or not to the same extent when the surface is uncharged. In consequence, an electrostatic charge pattern can be recorded in terms of liquid deposit by simply flooding or otherwise supplying the support with liquid and allowing the surplus liquid to drain away. The said earlier patent application claims a process in which an electrostatic charge pattern is created in or on a solid surface area and this area is simultaneously or subsequently supplied non-differentially with liquid material the surface tension between which and the said solid surface is so influenced by the presence or by the presence and degree of the electrostatic charges that the liquid selectively or differentially wets the said surface according to the said electrostatic charge pattern.

As stated in the said earlier application the methods therein claimed may be used for recording an electrostatic charge pattern created in a photoconductive layer.

A conventional manner of producing an electrostatic charge pattern in a photoconductive layer is to apply an overall electrostatic charge by means of an electric field and then to expose the charged layer to a pattern of light to be recorded. The present invention is concerned with the use of processes as claimed in the said earlier patent application for recording electrostatic charge patterns induced in a photoconductive layer by an electric field subsequent to or simultaneously with exposure of the photoconductive layer to the radiation pattern to be recorded. It is known that some form of latent conductivity image can be formed in a photoconductive layer merely by image-wise exposure thereof. A probable explanation of the phenomenon according to which the radiation incident upon the photoconductive layer creates a latent "electron image" is given by A. Amick in R.C.A. Review, December 1959, pp. 763–764, but we do not wish to be tied to any theory of the latent image formation. If a material comprising a photoconductive layer which bears a conductivity image is appropriately traversed by an electric field an electrostatic charge pattern is formed, and if a supply of liquid which only wets the surface of said material in areas bearing a sufficient electrostatic charge is made available in the electric field, selective or differential wetting of the surface under the influence of the electrostatic charges can be achieved. The latent image can be one formed prior to the traversal of the material by the electric field or one formed while such field is present.

We have developed processes by which light and other radiation images can be very simply and cheaply developed by means of liquids and by which either reversal or direct positive copies of documents may be produced.

The present invention includes a first process in which an electrostatic charge pattern is created in or on a surface area of a material comprising a photoconductive layer, by traversing said material by an electric field during or subsequent to exposure of said material to a pattern of radiation and while the said area is supplied non-differentially with liquid the interfacial tension between which and the said surface is so influenced by the presence or by the presence and degree of the electrostatic charges that the liquid selectively or differentially wets the said surface according to the said electrostatic charge pattern.

The present invention includes a second process according to which a material comprising a photoconductive layer is exposed to a pattern of radiation and is simultaneously or subsequently traversed by an electric field in which a supply of liquid is made available near to said material so that liquid is selectively or differentially attracted from said supply and deposited to form a liquid pattern according to the radiation pattern.

As in the U.S. patent application No. 150,820 the expression "radiation pattern" is used broadly to include any distribution of radiation such that different areas of the photoconductive layer on which it is incident are irradiated to different extents or such that some parts only are irradiated, and the electrostatic charge pattern may be one in which all parts of an area are charged but to different extents and/or with different sign (i.e. some positive and some negative), or one in which only some parts of the area are charged. Thus the expression "radiation pattern" includes light or other radiation images of reading matter, diagrams, pictures, etc., and radiation patterns constituting signals. The invention is more particularly intended for use in recording visible and ultra violet radiation but other electromagnetic radiation can be recorded.

With regard to the first process according to this invention, in stating that the liquid is non-differentially supplied to the surface area bearing the electrostatic charge pattern we mean that the liquid is made available for wetting the whole surface area, and the fact that this is not uniformly wetted is not due to the manner in which the liquid is supplied but to the properties of the surface and the effects of the electrostatic charges: if an uncharged material with a surface wettable by the liquid were subjected to the same treatment, the whole surface would be substantially uniformly wetted. A very good way of supplying liquid to the material comprising the photoconductive layer is by means of a roller wetted with the liquid, the roller being rolled along the surface of said material so that this surface is brought progressively into contact or virtual contact with a continuous liquid face. A said roller may be a smooth-surfaced roller or one which has an irregular surface or is provided with channels or recesses or is otherwise formed to enhance its liquid holding capacity.

The power of a liquid to wet a given solid surface can be expressed in terms of the so-called contact angle, which is the angle between the said surface and a tangent to the surface of a drop of the liquid placed thereon, such tangent being in a plane normal to the solid surface and passing through a point at which the drop surface touches the said solid surface (see J. Alexander, Colloid Chemistry, vol. 1, Principles and Applications, 4th ed., D. Van Nostrand Company, Inc., New York, pp. 79–80). It is advantageous in carrying out the present invention to use a liquid which, in the absence of electrostatic charges does not wet the surface of the material comprising the photoconductive layer (e.g. a liquid which makes with the solid surface a contact angle of at least 90°), but which in the presence of an electric field of the kind and magnitude used in the process makes with said solid surface a contact angle which is less than 70° and preferably is or approaches 0° so giving rise to wetting by spreading. However, useful results can be achieved by overall but differential wetting.

It should be noted that the roughness of the solid surface on which the liquid deposits influences the contact angle of the liquid, as is referred to in the aforesaid patent application of earlier date.

The electric field in which surface wetting takes place may be created by applying an electric potential or potentials between a sufficiently conductive backing for the photoconductive layer and a carrier for the liquid, such carrier being located or moved parallel with the photoconductive layer so that the field is normal thereto. A said liquid carrier may e.g. be a roller as already referred to. As an alternative a potential or potentials may be applied between a said backing for the photoconductive layer and an electrode other than a said liquid carrier, in contact with the liquid. The electric field may be a continuous or pulsating or intermittent direct current field or an alternating current field, and as will hereafter be explained the nature and strength of the field influences the results obtained.

In carrying out the second process according to the invention a very good way of making a supply of liquid available near to the material comprising a photoconductive layer is a roller which is formed with liquid-holding spaces which open at the surface of the roller and are of capillary size so that when the roller, after being charged with a suitable liquid, is rolled along a flat uncharged surface, the supply of liquid in the spaces is held out of contact with the surface by capillary forces. An example of a construction of roller which will serve is one having a helical surface groove of capillary size. An alternative suitable form of roller is one having a plurality of endless parallel capillary grooves. Other forms of roller are also possible, e.g., a roller with surface hollowings or recesses.

When a said roller is rolled along the surface of an image-wise exposed material comprising a photoconductive layer, in a process according to the invention, the electrostatic charges selectively or differentially attract liquid from the liquid-holding spaces, this displacement of liquid being possibly assisted by gravity, depending on the orientation of said material with respect to the roller. If the raised portions of the roller surface, i.e., the crest portions between the capillary grooves, are themselves wetted with a film of the liquid then liquid may transfer from these crest portions onto the surface along which the roller moves. In many practical applications of the invention steps will need to be taken to avoid this transfer of liquid by physical contact but it is to be understood that the claims of this specification are not to be construed as excluding a case in which such transfer by contact occurs. For one thing the transfer is not necessarily destructive of the liquid pattern which is created by deposit of liquid under the influence of the electrostatic charges: the additional liquid transferred by contact of the roller merely impairs the quality of the record.

However steps can easily be taken to avoid transfer of liquid from a said roller otherwise than in areas where deposit of liquid is required for purposes of the record. For example the surface of the roller can be of a material which is lyophobic with respect to the liquid employed so that the crest portions are unwetted. Alternatively or in addition, the surface onto which the liquid deposits can be of a material which is lyophobic with respect to said liquid in the absence of electrostatic charges. This latter is a very advantageous feature and further particulars in regard to it will be given hereinafter.

The electric field causing selective or differential deposition of liquid may be created by applying an electric potential or potentials between a sufficiently conductive backing for the photoconductive layer and a carrier for the liquid, such carrier being located or moved parallel with the photoconductive layer so that the field is normal thereto. A said liquid carrier may, e.g., be a roller as above referred to. As an alternative a potential or potentials may be applied between a said backing for the photoconductive layer and an electrode other than a said liquid carrier, in contact with the liquid. The electric field may be a continuous or pulsating or intermittent direct current field or an alternating current field, and as will hereafter be explained the nature and strength of the field influences the results obtained.

A particular advantage of the invention is that direct positive or reversal prints of documents can be obtained according to choice by appropriate selection of the electric field characteristics and it is therefore to be understood that when we speak of selective or differential deposit of liquid according to a radiation pattern we mean that the deposited liquid forms a pattern which visibly or detectably records the subject of the radiation pattern. The liquid and radiation records need not correspond in the sense that two positive records of a text correspond; on the contrary one may be "positive" and the other "negative."

In both processes the liquid may deposit on the photoconductive layer but this is not essential. There may be an intervening layer between the liquid supply and the photoconductive layer. For example the deposition may occur on a material comprising a photoconductive layer over-coated with another layer, e.g. a thin layer of a material selected, e.g., with regard to its lyophobic properties, to promote acceptance of the deposited liquid without permitting its lateral diffusion.

By way of modification of the invention as hereinbefore defined, a sheet distinct from but held in intimate contact with the material which comprises the photoconductive layer may be traversed by the electric field together with said material comprising a photoconductive layer so that an electrostatic charge pattern is induced in or on said sheet and so that the liquid selectively or differentially is deposited on the surface of said sheet instead of a surface of the material comprising the photoconductive layer.

The liquid used in both processes may be a single substance or it may be a solution. Moreover it may contain an emulsified or suspended substance. It will be understood however that the selection of liquid for use in the first process must be made with due regard to the composition form and physical properties of the surface onto which the liquid is to be supplied in order that the differential or selective wetting action can take place; preferably the said surface is hydrophobic and the liquid consists for the greater part of water. Subject to this qualification the liquid may, for example, be an ink or dye. In that case the process according to the invention is a one-step development process in which, by the application of developing liquid, a visible image which after evaporation of the solvent or dispersing agent does not require a special after treatment for fixing purposes, is created. As an alternative, the liquid may be a liquid which or a component of which reacts, e.g., with a component present in the surface which is selectively or differentially wetted by the liquid, or with the atmosphere, to form a dye. The liquid need not therefore in itself immediately produce a visible record. Moreover the selective or differential wetting by the liquid under the influence of the electric field need not in itself bring about development of the latent image in the sense of producing a visible record. A variety of other procedures are possible. Thus, as one example, by selectively or differentially wetting a surface with an uncoloured hydrophilic composition under the influence of the electric field and according to a radiation image to which the photoconductive layer is or has been exposed the resulting image-wise wetted surface can be converted into a form in which the image is visible by passing over the surface a roller charged with an aqueous dyestuff solution, or by bringing the said surface into contact with a substance (which may e.g. be in the form of a mist or vapour) which reacts with the liquid applied under the influence of the electric field, to form a coloured compound or compounds.

Liquid retained by the surface to which it is supplied under the influence of the electric field in accordance with the invention, can be transferred to another surface for the purpose of producing a visible record on that surface in the same or by a subsequent step, and if the composition of the photoconductive layer is suitably chosen as will hereafter be exemplified, the same pattern-wise exposed material may be used for forming two or more such transfer images without re-exposing it to radiation.

Very suitable photoconductive layers for use in processes according to the invention are layers comprising photoconductive zinc oxide in an insulating polymeric binder which is lyophobic with respect to the liquid material employed, more particularly a binder comprising one or more polyvinyl esters. The use of photoconductive zinc oxide which has been treated with acid as described in the specification of an earlier U.S. patent application No. 171,781, now abandoned, is recommended.

Special advantages attach to the use in carrying out the present invention of photoconductive layers comprising photoconductive zinc oxide which has been treated with a dicarboxylic acid. It is found that a layer incorporating photoconductive zinc oxide so treated has a good radiation memory, i.e., the latent image formed by exposure of the layer to light or other radiation persists for a considerable time after the termination of the exposure. This is of real practical importance in cases in which the development of the latent image takes place after the exposure step.

Particularly good results can be obtained in processes according to the invention when using photoconductive layers incorporating photoconductive zinc oxide which has been treated with a dicarboxylic acid and an organic acid phosphorus compound, examples of which will hereafter be given, since an effect of such a treatment using an organic acid phosphorus compound is that the dark resistivity of the zinc oxide is increased.

The materials comprising a photoconductive layer used in carrying out the invention may comprise a photoconductive layer united with a relatively conductive backing, e.g., a sheet of paper, e.g., by coating such backing with a composition comprising the photoconductor and binder. As an alternative the photoconductive layer may be a self-supporting layer and this may be coated on one side with a conductive coating and/or it may be held in intimate contact during the process with a relatively conductive backing such as a metal plate.

In order to explain the first process of the present invention, in more detail, and different ways in which it may be performed, reference is now made to the accompanying diagrammatic drawings in which:

FIGURES 1a, 1b and 1c represent three stages of one process whereby positive images can be obtained from negative originals, FIGURES 2a, 2b and 2c represent three stages in a process whereby direct positive images can be obtained from positive originals, FIGURE 3 shows part of a copying apparatus utilising a process according to the invention, FIGURE 4 shows an alternative apparatus, FIGURE 5 shows a third type of apparatus in which exposure and development proceed simultaneously, and FIGURE 6 shows a form of apparatus similar to that shown in FIGURES 5, embodied in an automatic printer.

Referring firstly to FIGURES 1a, 1b and 1c, light from a light source 1 is projected through a negative record 2 onto a photoconductive material generally denoted 2 and comprising a photoconductive layer 4 bonded to a relatively conductive backing 5.

Following exposure of the photoconductive material 3, it is passed between two smooth surfaced metal rollers 6, 7 as shown in FIGURE 1b. Roller 6 is previously wetted with a film of liquid 9. The material of the photoconductive layer 4 is such in relation to the liquid that in the normal way the liquid will not wet the layer 4. Rollers 6 and 7 are connected to the negative and positive terminals respectively of a direct current source 10 which during passage of the photoconductive material between the rollers maintains a potential difference between the rollers. If an appropriate voltage is chosen, in the areas where the photoconductive material was not exposed to light the surface of such material remains lyophobic with respect to the liquid but in the areas of the photoconductive material which were exposed to light, the interfacial tension between the said surface and the liquid is lower (due to the presence of the electrostatic charges on the material 3) and in these areas the liquid wets the surface of the photoconductive layer 4. In the result, after passing between the rollers, the photoconductive material bears a positive image of the subject of the negative record 2 as appears in FIGURE 1c. Appropriate voltages for use with different materials will be exemplified hereafter. When operating a process as described with reference to FIGURE 1 it is found that if the voltage potential between the rollers is raised above a certain value, which depends in a given case on the thicknesses and compositions of the constituent layers of the photoconductive material and the speed of passage between the rollers, liquid also wets the unexposed areas of the photoconductive material although not to the same extent as in the exposed areas.

The maximum interval of time which is permissible between the exposure step (FIGURE 1a) and the developing step (FIGURE 1b) depends on the material of the photoconductive layer. In many cases (e.g., when using a photoconductive layer as described in Example 1) the conductivity image formed by the the exposure persists and can be developed as long as 30 minutes after an exposure.

The process represented by FIGURES 2a, 2b and 2c is illustrated with reference to the copying of a positive record 11. The photoconductive material 3, the liquid and the actual process steps are the same as in FIGURES 1a, 1b and 1c save in that the polarity of the rollers 6, 7 is reversed. Roller 6 is now connected to the positive side of the direct current source 10. The result is that liquid of the liquid film wets the photoconductive layer 4 in the areas which were unexposed to the light so that as appears in FIGURE 2c, the photoconductive material emerging from the rollers bears a direct positive image.

When in tests performed according to FIGURES 2a, 2b and 2c the voltage was reduced below a certain value, depending on the thickness and composition of the photoconductive material and its speed of movement, the photoconductive layer was not wetted at all by the liquid.

As we have already stated, it is not always necessary to use a direct current field. If the photoconductive layer has rectifying properties, alternating current may be used. When an alternating current source with an appropriate voltage and frequency is used in place of the direct current source 10 in a process according to FIGURES 1b or 2b, liquid wets the exposed areas of the photoconductive layer so that a positive record is obtained on the photoconductive material after exposing this through a negative subject. An actual example of such a process, giving the voltage and frequency, will be given hereinafter. When operating such a process it is found that if an alternating current at a voltage above a certain value, which depends on the photoconductive material and the speed of development, is used, liquid also wets the unexposed areas although not to the same extent as the exposed areas. The voltage required for obtaining a given wetting when using alternating current is higher than the direct current voltage necessary for wetting to an equivalent extent.

It is not necessary when an alternating current field is used, to employ a sinusoidal alternating current voltage; fields of other wave form can be utilised, even fields formed by the combination of direct and alternating current voltages.

While proceses according to the invention depend upon the application of an appropriate voltage for creating the electric field, whether direct or alternating, there is no difficulty in determining the voltage required for good results by a few simple tests and the voltage is in any case not critical in the sense that a particular voltage must be used before results are obtained. On the contrary, subjects can be copied using different voltages within a substantial voltage range. When using alternating current voltage the frequency is for practical purposes preferably between about 50 c./s. and 5 kc./s.

FIGURES 3 and 4 of the accompanying drawings indicate two different ways in which a liquid-carrying roller can be kept charged with liquid for performing processes as described with reference to FIGURES 1 and 2. In FIGURES 3 and 4 parts which correspond in function to parts described in connection with FIGURES 1 and 2 are denoted by the same reference numerals. Thus in FIGURES 3 and 4 the liquid-carrying roller is roller 6. In the FIGURE 3 apparatus, roller 6 rotates in a container 12 containing developer liquid 9. The roller 6 is therefore kept charged with liquid. A doctor knife 13 is provided for regulating the liquid supply. The rollers 6, 7 are connected to a direct current source (not shown in FIGURE 3) and a latent conductivity image in the photoconductive layer 4 of a photoconductive material 3 is developed by feeding the material between the rollers with the photoconductive layer in contact with roller 6 and the relatively conductive backing layer 5 in contact with roller 7. The rollers can be driven in any convenient manner, e.g., through meshing gears by means of an electric motor.

In the apparatus according to FIGURE 4 the liquid-applying roller 6 is the upper one of the two rollers between which the photoconductive material feeds for development and the roller is kept charged with developer liquid by an inking roller 14 which dips into a supply of liquid in a container 15 and runs in contact with the roller 6. A doctor knife 13 is also provided in this apparatus for regulating the amount of liquid taken round by the roller 6 to the nip of the rollers 6, 7. The FIGURE 4 apparatus is used by feeding the photoconductive material between the rollers with the photoconductive layer 4 uppermost.

In apparatus as shown in FIGURES 3 and 4 the electrode-forming rollers 6, 7 are preferably made of stainless steel or copper, or other conductive material with a resistivity less or at any rate not substantially higher than that of the developer liquid. The rate of displacement of the photoconductive material 3 between the rollers may e.g. be from 1 cm. to 20 m. per sec.

While we for carrying out the first process according to the present invention have especially referred to the use of a smooth-surfaced roller 6 for bringing the liquid to the photoconductive material, also other forms of a liquid applicator can be used. For example, a roller coated with a resilient porous material and therefore having a good liquid-holding capacity may be used, or a roller with some other form of receptive spaces for liquid may be used, e.g. a roller with spaced parallel endless surface grooves or with a single helical surface groove such as the helically grooved roller described and illustrated in the other patent application filed on even date herewith by the same applicant. The receptive spaces for liquid may be of capillary size provided that the capillary forces do not prevent the formation of a continuous liquid face for contacting the surface of the photoconductive material. In the case of a roller with a resilient surface the liquid can be squeezed out of capillary spaces by pressure exerted by a co-operating roller (such as roller 7 in FIGURES 3 and 4). If a roller with a non-resilient surface and liquid-holding grooves or other spaces of capillary size is charged with liquid and rotated at sufficient speed the liquid is displaced outwardly against the capillary forces by centrifugal force so that a meniscus of bead is formed where the roller runs against the photoconductive material; accordingly such a roller may be used as liquid applicator in the first process according to the invention provided the roller rotates sufficiently quickly during the passage of photoconductive material.

Reference is now made to FIGURE 5 which shows apparatus by which documents and other subjects can be copied according to the invention by a process in which exposure of the photoconductive layer and development proceed simultaneously.

The apparatus comprises a rotatably mounted hollow cylinder 16 comprising a glass tube 17 coated successively with a transparent electrically conductive layer 18 and a photoconductive layer 19 which is lyophobic with respect to the developing liquid to be used. Within the cylinder 16, along its axis, is a light source 20. A document 21 to be copied can be inserted into the cylinder as shown so that the document lies in contact with the interior surface of the glass tube 17 and so that when the light source is functioning a light image of the document is projected through the tube 17 and conductive layer 18, onto the photoconductive layer 19. The apparatus further comprises an electrically insulating smooth-surfaced roller 22 mounted for rotation in contact with cylinder 16, and an electrically conductive smooth-surfaced roller 23 which intrudes into a container 24 for suitable developing liquid 25, e.g., an ink with a fairly high electrical conductivity. A doctor knife 26 is provided for removing surplus ink from the inking roller. A source 27 of direct or alternating current potential is connected on the one hand to the electrically conductive layer 18 of the cylinder 16 and on the other hand to an electrode 28 located in the body of developing liquid in container 23. The apparatus further comprises driving means (not shown) of any conventional form, e.g., an electric motor and chain and sprocket transmission, for turning the cylinder 16 and the rollers 22 and 23 in the direction of the arrows.

When the apparatus is in use, the surface of the electrically insulating roller 22 is kept wetted with a film of the developing liquid by the inking roller 23. This ink film is continuous with the body of liquid in the container 24 containing the electrode 28. As the ink film runs in contact with the photoconductive layer 19 and the electrically conductive layer 18 which backs this photoconductive layer is connected to the other terminal of the voltage source 27, it will be clear that a steady or alternating potential is maintained across the photoconductive layer 19 at the common tangent point of the cylinder 16 and the roller 22 so that the photoconductive layer is traversed by an electric field. Under the influence of this electric field, ink from the said ink film selectively or differentially wets the photoconductive layer in accordance with the light pattern projected thereon.

The resulting ink image on the outside surface of cylinder 16 may be transferred to another support, e.g., paper sheet. Thus the apparatus according to FIGURE 5 can form the basis of a rapid printing apparatus by which any desired number of copies of an original document can be obtained.

Such a printing apparatus is illustrated by FIGURE 6 in which parts corresponding in function with parts present in the FIGURE 5 apparatus are denoted by the same reference numerals. As the FIGURE 6 apparatus functions to produce an ink image on the cylinder 16 in much the same way as the FIGURE 5 apparatus, detailed description of FIGURE 6 is not necessary; the relevant part of the FIGURE 6 apparatus differs from the FIGURE 5 apparatus only in that the electrically insulating transfer roller 22 of FIGURE 5 is omitted and the inking roller 23 carries an ink film directly to the cylinder 16. Adjacent the cylinder 16 in the FIGURE 6 apparatus is a guide roller 29 and a web of paper 30 is conducted through the nip formed by this roller 29 and the cylinder 16 so that the ink image progressively formed on cylinder 16 at the nip of cylinder 16 and inking roller 23 is progressively transferred from the cylinder 16 onto the transfer paper 30. By keeping the apparatus in motion, the document 21 is repetitively printed onto the paper web 30.

The transfer paper used in operating the FIGURE 6 apparatus can be a porous paper which rapidly takes up ink from the cylinder 16 so that very rapid printing is possible. Transfer of ink to the paper web can alternatively or in addition be facilitated by application of a voltage potential across the web, e.g., by applying a potential to the guide roller 29.

The rollers 22 and 23 in FIGURES 5 and 6 can be smooth-surfaced rollers as stated. Alternatively roller 22 in FIGURE 5 or roller 23 in FIGURE 6 may have an irregular or interrupted surface, e.g. it may be coated with a woven material, to enhance the ink-holding capacity of the roller, or the roller may have grooves or recesses for holding developing liquid. Such grooves or recesses may be of capillary size provided it is ensured, e.g., by appropriate selection of the roller speed as before referred to, that a liquid meniscus or bead is present to provide a continuous liquid face for contacting the surface of the photoconductive layer.

In order to explain the second process according to the present invention in more detail, and different ways in which it may be performed, reference is now made to the accompanying diagrammatic drawings in which:

FIGURES 7a, 7b and 7c represent three stages of one process whereby direct positive images can be obtained negative originals, FIGURES 8a, 8b and 8c represent three stages in a process whereby direct poitive images can be obtained from positive originals.

Referring firstly to FIGURES 7a, 7b and 7c, light from a light source 31 is projected through a negative record 32 onto a photoconductive material generally denoted 33 and comprising a photoconductive layer 43 bonded to a relatively conductive backing 35.

Following exposures of the photoconductive material 33, it is passed between two metal rollers 36, 37 as shown in FIGURE 7b. Roller 36 has in its surface a helical groove 38 of capillary size which is maintained charged with liquid 39. Rollers 36 and 37 are connected to the negative and positive terminals respectively of a direct current source 40 which during passage of the photoconductive material between the rollers maintains a potential difference between the rollers. If an appropriate voltage is chosen in the areas where the photoconductive material was not exposed to light the capillary groove 38 serves to hold the liquid 9 out of contact with the photoconductive layer 34 but in the areas of the photoconductive material which were exposed to light, liquid from the capillary groove 38 in roller 36, deposits on the photoconductive layer 34 as appears in FIGURE 7c so that after passing between the rollers the photoconductive material bears a positive image of the subject of the negative record 2 as appears in FIGURE 7c. Appropriate voltages for use with different materials will be exemplified hereafter. When operating a process as described with reference to FIGURE 7 it is found that if the voltage potential between the rollers is raised above a certain value, which depends in a given case on the thickness and compositions of the constituent layers of the photoconductive material and the speed of passage between the rollers, liquid is also deposited on the unexposed areas of the photoconductive material although not to the same extent as on the exposed areas.

The maximum interval of time which is permissible between the exposure step (FIGURE 7a) and the developing stem (FIGURE 7b) depends on the material of the photoconductive layer. In many cases (e.g., when using a photoconductive layer comprising as described in Example 1 hereof) the conductivity image formed by the exposure persists and can be developed as long as 30 minutes after an exposure.

The process represented by FIGURES 8a, 8b and 8c is illustrated wtih reference to the copying of a positive record 32. The photoconductive material 33, the liquid and the actual process steps are the same as in FIGURES 7a, 7b and 7c save in that the polarity of the rollers 36, 37 is reversed. Roller 36 is now connected to the positive side of the direct current source 40. The result is that liquid 39 from the capillary groove 38 in roller 36 deposits on the photoconductive layer 34 in the areas which were unexposed to the light so that as appears in FIGURE 8c, the photoconductive material emerging from the rollers bears a direct positive image.

When in tests performed according to FIGURES 8a, 8b and 8c the voltage was reduced below a certain value, depending on the thickness and composition of the photoconductive material and its speed of movement, liquid was not deposited on the photoconductive material.

As we have already stated, it is not always necessary to use a direct current field. If the photoconductive layer has rectifying properties, alternating current may be used. When an alternating current source with an appropriate voltage and frequency is used in place of the direct current source 40 in a process according to FIGURE 7b or 8b, liquid is deposited on the exposed areas of the photoconductive layer so that a positive record is obtained on the photoconductive material after exposing this through a negative subject. An actual example of such a process, giving the voltage and frequency, will be given hereafter. When operating such a process it is found that if an alternating current at a voltage above a certain value, which depends on the photoconductive material and the speed of development, is used, liquid is also deposited on the unexposed areas although not to the same extent as on the exposed areas. The voltage required for obtaining a given liquid deposit when using alternating current is higher than the direct current voltage necessary for obtaining an equivalent deposit.

It is not necessary when an alternating current field is used, to employ a sinusoidal alternating current voltage; fields of other wave form can be utilised, even fields formed by the combination of direct and alternating current voltages.

While processes according to the invention depend upon the application of an appropriate voltage for creating the electric field, whether direct or alternating, there is no difficulty in determining the voltage required for good results by a few simple tests and the voltage is in any case not critical in the sense that a particular voltage must be used before results are obtained. On the contrary, subjects can be copied using different voltages within a substantial voltage range. When using alternating current voltage the frequency is for practical purposes preferably between about 50 c./s. and 5 kc./s.

FIGURES 3 and 4 of the accompanying drawings indicate two different ways in which a liquid-carrying roller can be kept charged with liquid for performing processes as described with reference to FIGURES 7 and 8. In FIGURES 3 and 4 parts which correspond in function to parts 33 to 37 described in connection with FIGURES 7 and 8 are denoted by reference numerals 3 to 7. Thus in FIGURES 3 and 4 the liquid-carrying roller 6 is now a grooved roller. In the FIGURE 3 apparatus, roller 6 rotates in a container 12 containing developer liquid 9. The capillary groove of the roller 6 is therefore kept charged with liquid. A doctor knife 13 is provided for regulating the liquid supply. The rollers 6, 7 are connected to a direct current source (not shown in FIGURE 3) and a latent conductivity image in the photoconductive layer 4 of a photoconductive material 3 is developed by feeding the material between the rollers with the photoconductive layer in contact with roller 6 and the relatively conductive backing layer 5 in contact with roller 7. The rollers can be driven in any convenient manner, e.g., through meshing gears by means of an electric motor.

In the apparatus according to FIGURE 4 the liquid-applying roller 6 is the upper one of the two rollers between which the photoconductive material feeds for development and the roller groove is kept charged with developer liquid by an inking roller 14 which dips into a supply of liquid in a container 15 and runs in contact with the roller 6. A doctor knife 13 is also provided in this apparatus for regulating the amount of liquid taken round by the roller 6 to the nip of the rollers 6, 7. The FIGURE 4 apparatus is used by feeding the photoconductive material between the rollers with the photoconductive layer 4 uppermost.

In apparatus as shown in FIGURES 3 and 4 the electrode-forming rollers 6, 7 are preferably made of stainless steel or copper, or other conductive material with a resistivity less or at any rate not substantially higher than that of the developer liquid. The rate of displacement of the photoconductive material 3 between the rollers may, e.g., be from 1 cm. to 20 m. per sec.

As an alternative to a roller 6 with a single helical capillary groove, a roller with multiple capillary grooves or with multiple capillary recesses may be used. The use of capillary size openings for the liquid affords a very good way of controlling the liquid supply. The electrical forces responsible for causing liquid to move from the capillaries and to deposit to form a liquid pattern are supplemented by the force of gravity in the event that the liquid is deposited by downward movement (as in FIGURE 4), and are partly offset by gravity in the event that the liquid deposits by upward movement (as in FIGURE 3).

With respect to the second process reference is also made to FIGURE 5 which shows apparatus by which documents and other subjects can be copied according to the invention by a process in which exposure of the photoconductive layer and development proceed simultaneously.

For carrying out the second process according to the present invention the apparatus of FIGURE 5 is the same as for the first process except for the insulating roller 22 which supplies the liquid in the near proximity of the photoconductive layer e.g. from a helical groove of capillary size formed in its surface. This groove does not appear in the drawing, but it may be of the same form as the groove 8 in the roller 6 of FIGURES 7 and 8.

When the apparatus is in use, according to the second process the groove of the electrically insulating roller 22 is kept charged with developing liquid by the inking roller 23. The ink in the groove of roller 22 is continuous with the body of liquid in the container 24 containing the electrode 28. When the electrically conductive layer 18 which backs this photoconductive layer is connected to the other terminal of the voltage source 27, it will be clear that a steady or alternating potential is maintained across the photoconductive layer 19 at the point of the cylinder 16 being near to the surface of the roller 22 so that the photoconductive layer is traversed by an electric field. Under the influence of the electric field, built up between the photoconductive layer and the ink in the groove, ink is attracted from the groove of roller 22 and selectively or differentially deposited on the photoconductive layer in accordance with the light pattern projected thereon.

An alternative way of creating the electric field would be to use a roller 22 which is electrically conductive and to connect this roller instead of the ink bath to one terminal of the voltage source 27.

As already described the resulting ink image on the outside surface of cylinder 16 may be transferred to another support, e.g., paper sheet. Thus the apparatus according to FIGURE 5 can also by applying the second process according to the present invention form the basis of a rapid printing apparatus by which any desired number of copies of an orginal document can be obtained.

Such a printing apparatus is already explained for the first process and is illustrated by FIGURE 6 in which parts corresponding in function with parts present in the FIGURE 5 apparatus are denoted by the same reference numerals. As the FIGURE 6 apparatus functions to produce an ink image on the cylinder 16 in much the same way as the FIGURE 5 apparatus, detailed description of FIGURE 6 is not necessary: the relevant part of the FIGURE 6 apparatus differs from the FIGURE 5 apparatus for the second process only in that the electrically insulating transfer roller 2 of FIGURE 5 is omitted and the inking roller 23 has a capillary groove in which ink is carried directly to the cylinder 16.

In any apparatus for performing the invention in which an inking or other roller has to be electrically conductive, such roller may be of metal as already referred to, but other materials can be used, e.g. electrically conductive polyvinyl chloride. In apparatus such as that illustrated in FIGURE 5 or 6 where the liquid applying roller is non-conductive, such roller may, e.g., be of normal non-conducting polyvinyl chloride.

Apparatus for use in carrying out the both processes of invention can have a liquid-carrying roller with a surface which is lyophobic with respect to the liquid employed.

By using a roller with capillary spaces for carrying the liquid to the material on which the liquid is to be selectively or differentially deposited, a very good control of the image quality is possible, merely by regulating the voltage.

The use of capillary holders for liquid developer in the art of recording radiation patterns has already been described in our earlier patent application Serial No. 150,820 which inter alia claims processes for developing electrostatic charge patterns by bringing into contact or into close proximity the electrostatic record and a liquid supply means in which a quantity or quanta of liquid is(are) held in capillary holes, grooves, passages or the like so that liquid is displaced from such capillary spares only in regions where the field strength (electrostatic charge) is sufficient to attract the liquid therefrom. In effect, processes accorting to the present invention and utilising liquid supply means of capillary form are processes according to that claim, with the further feature that the electrostatic record is created by means of an electric field, simultaneously with the development.

It is possible to dispense with the use of capillary holders for liquid in carrying out the present invention. Thus an alternative way of carrying out the invention is to move the photoconductive material along a path which is just spaced from the surface of a supply of liquid which is otherwise held on a roller, plate or other member by cohesion, adhesion, electrostatic attraction, gravity or other forces.

Good image quality can be promoted in processes according to the invention by selecting the material of the surface on which the recording liquid deposits under the influence of the electric field so that the power of the liquid to wet the surface varies according to the degree of electrostatic charge detectable at such surface. As is explained in our earlier filed U.S. patent application No. 150,820 the interfacial tension which exists between a surface and a liquid brought into contact with it and which determines the degree to which the liquid wets the surface, can in the case of certain materials be so influenced by the presence of electrostatic charges that an electrostatic charge pattern conferred on a suitable photoconductor material can be recorded in terms of a wetting liquid deposit by simply flooding the surface with the liquid and allowing surplus liquid to drain away. When carrying out a process according to the present invention the electric field extending transversely through the material on which the liquid deposits, apparently induces an electrostatic charge pattern according to the pattern of radiation to which the photoconductive material is or has been exposed. Whatever be the correct way of describing the direct effect of the electric field, one of its indirect effects in some cases, depending on the surface and liquid materials used, is that if liquid is brought into contact with the whole surface, the interfacial tension between the liquid and the surface is strongly irradiated areas thereof is different from the interfacial tension between the liquid and surface in non-irradiated or little irradiated areas. The value of this phenomeneon in the performance of the present invention is that by appropriate choice of materials the fidelity with which a radiation pattern is recorded in terms of surface wetting can me made very high. For example, if the material of the surface on which the liquid deposits is normally lyophobic with respect to the liquid employed but is rendered lyophilic when a sufficient electrostatic charge is present, this favours the production of sharply defined images when using a roller with capillary reservoirs for applying the liquid by rolling the roller over the surface on which the liquid is to be deposited, because unwanted wetting of the surface by traces of liquid which may be present on the raised or crest portions of the roller is inhibited.

At least it is interesting to compare the first process according to the present invention, with the electrolytic process already referred to, for recording light images. Such an electrolytic process is described in the afore-mentioned R.C.A. Review (December 1959) at pp. 765–766. In this electrolytic process an electrolyte solution is brought into contact with the surface of a photoconductive layer which has been image-wise exposed, while a potential difference is applied between the unexposed side of the photoconductive layer and an electrolyte which is in contact with the exposed side. The photoconductive layer has to be coated onto a metal foil or onto a paper coated with metal. For good image formation, a high current intensity and a low voltage is required. The entire surface of the photoconductive layer is wetted and the latent electron image is recorded by metal precipitate which forms on the exposed areas of the photoconductive layer. It is not possible to precipitate the metal on the unexposed areas to form a direct positive image.

As is exemplified by FIGURES 2a–c of the accompanying drawings the present invention can be applied for obtaining direct positive prints. It is also to be noted that the invention can be worked using a high voltage and a relatively low current intensity.

By using a grooved or like roller as liquid applicator as above referred to a very good control of the image quality is possible, merely by regulating the voltage. It should be noted however that the faster speed used for a capillary roller in general involves higher voltages since the contact time with the photoconductive material is less.

We now give further details of materials which can be used in carrying out the invention.

Our co-pending U.S. application No. 171,781 lists various commercially available brands of zinc oxide manufactured by the so-called "French Process," i.e. by oxidation of zinc vapour, and those zinc oxides are very suitable for use in carrying out the present invention. Another brand of zinc oxide which is very suitable is Zinc Oxide Standard Gold Seal marketed by Durham Chemicals Ltd., Birtley, England.

The photoconductive layer preferably comprises at least 50% by weight of a photoconductive zinc oxide dispersed in a polymeric binding agent.

Some or all of the zinc oxide grains should preferably have been treated with a dicarboxylic acid. Some or all of the zinc oxide grains preferably also bear one or more organic phosphorus compounds, e.g. in an amount of 0.1–10% by weight of the zinc oxide. Reference is made to the earlier filed U.S. application No. 171,781 disclosing a variety of compounds with acid properties for use in treating photoconductive zinc oxide to improve its properties as a constituent of photoconductive layers. We would here specifically mention the following compounds with acid properties:

Aliphatic non-substituted mono- and dibasic carboxylic acids or aliphatic mono- and dibasic acids which may contain one or more hydroxyl groups such as lactic acid and tartaric acid, Acid phosphorus compounds, preferably oxy-acids derived from phosphorus, e.g., acid organic phosphates corresponding to the general formulae

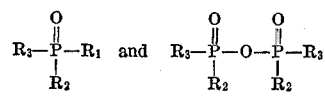

wherein:

$R_1$ represents a hydrogen atom, a hydroxyl group or a chlorine atom, $R_2$ represents a hydroxyl group, a chlorine atom, an alkyl group, a substituted alkyl group, an aryl group, a substituted aryl group, an alkoxy group, a substituted alkoxy group, an aryloxy group or a substituted aryloxy group, and R$_3$ represents an alkyl group, a substituted alkyl group, an aryl group, a substituted aryl group, an alkoxy group, a substituted alkoxy group, an aryloxy group or a substituted aryloxy group.

The zinc oxide can be treated simultaneously with different kinds of acids. Especially good results are obtained with a combination of aliphatic acids especially dicarboxylic acids and mentioned acid phosphorus compounds.

As examples of binding agents for use in a photo-conductive layer to be used in carrying out the present invention we refer to the compounds listed and classified in four different classes in the specification of the earlier filed U.S. patent application No. 150,820 particularly the polymeric binding agents therein listed. We would also mention that photoconductive polymers may be used as binding agents, e.g. the polymers described in Belgian patent specification Nos. 588,048 and 588,050. Other suitable binding agents which have the advantage of increasing the sensitivity of zinc oxide are described in the earlier filed French patent specification No. 1,294,375. As already mentioned we prefer to use hydrophobic polymeric binding agents which are very suitable for use in a photoconductive layer to be used in carrying out the present invention are those listed in the specification of the earlier filed U.S. patent application No. 150,820.

If polystyrene-butadiene latexes are used as binding agents, a thermal after-treatment can be applied as described in U.S. specification No. 2,875,054.

Methods according to the invention do not require the photoconductive layer to carry electrostatic charges during a relatively long time as do the conventional xerographic techniques involving the development of electrostatic latent images produced by the image-wise exposure of photoconductive layers bearing an overall electrostatic charge. Consequently the choice of binding agent for a photoconductive layer to be used in carrying out the present invention is much less critical with regard to electrical properties, and it is not necessary for the resistivity of the binding agent to be considerably higher than that of the photoconductor. For the same reason, photoconductive layers used in performing the present invention can be thinner than those customarily used in the said known xerographic techniques.

The ratio of photoconductor to binding agent in the photoconductive layer naturally influences the mechanical strength and electrical properties of the layer. When using photoconductive zinc oxide in a polyvinyl compound as binding agent we have obtained good results with ratios of the photoconductor to binding agent of from 3:1 to 9:1. The mechanical strength of the layer will be insufficient if too little binding agent is used; if too much binding agent is used the image sharpness will be poor.

The dark-resistivity of the photoconductive layer should in general be above $10^{10}$ ohm. cm. The compound or compounds selected as a binding agent does not necessarily determine the lyophobicity or lyophilicity of the material comprising the photoconductive layer. For example if a hydrophobic layer with water-repelling properties is required, the photoconductive layer may comprise in addition to binding agent which is not itself sufficiently hydrophobic, a special additive or additives which confer the required hydrophobic property. An additive enhancing hydrophobicity is, e.g., stearic acid (see e.g. Belgian patent specification No. 562,337). Moreover, some binding agents which are not in thermselves hydrophobic or sufficiently hydrophobic may be modified in this respect by after-treatment. For example, binding agents bearing active hydroxyl groups may be reacted with di-isocyanates (see e.g., Belgian patent specification No. 568,418). In some cases the hydrophobicity of a photoconductive layer can be modified by adsorbing an appropriate substance after formation of the layer.

Moreover, we have already stated that the wetting under the influence of the electric field may take place on a layer intervening between the liquid supply and the photoconductive layer, so that it is possible for example to confer a required hydrophobic property on a material comprising a photoconductive layer which is hydrophilic or insufficiently hydrophobic by coating the photoconductive layer with a hydrophobic material, e.g., a hydrophobic polymer, varnish or wax, which forms a transparent or translucent coating layer. Conversely, a photoconductive layer which is more hydrophobic than is required can be coated over with a translucent layer of a less hydrophobic substance or a hydrophilic property may be conferred on the material by coating the hydrophobic photoconductive layer with a small quantity of a hydrophilic colloid, e.g., gelatin, polyvinyl alcohol or a hydrophilic derivative thereof, a cellulose derivative, or alginic acid or an alginic acid derivative.

Materials comprising a photoconductive layer with or without a coating layer, used in performing the present invention, may incorporate in the photoconductive layer and/or in a said coating layer, additives such as plasticizers, dispersing agents, optical bleaching agents, substances for counteracting oxidation and ageing, agents for improving gloss, matting agents, sensitizing dyes or chlorine-containing polymers which increase the sensitivity as described in the earlier filed French patent specification No. 1,294,375.

The surface of the photoconductive layer or other material wetted by the liquid to form the record of the latent image formed by the exposure step need not be impermeable by the liquid; the presence of micropores in the surface does not impair the development.

The photoconductive layer is used in contact with a sufficiently conductive backing and preferably the photoconductive layer and backing are permanently united to form a single plural-layer material. The resistivity of the backing is preferably substantially smaller than the dark-resistivity of the photoconductive layer. In general we prefer to use backing materials having a conductivity at least one hundred times that of the photoconductive layer.

As examples of conductive backings for a photoconductive layer, we refer to plates or foils of metal such as aluminum, copper, bronze, lead and zinc, glassplates provided with a thin layer of tin oxide having a specific resistivity of 10 to $10^5$ ohm cm., foils or fabrics of plastic substances provided with a thin conductive layer as described in the Belgian patent specification 585,555, and paper. Suitable kinds of paper are those which show a resistivity lower than $10^{10}$ ohm cm. at a relative humidity of 50% e.g. the kinds of paper described in the Belgian patent specification 602,794. Other suitable kinds of paper are those containing at least 2% of conductive filling materials e.g. carbon. Other suitable papers are those of which the surface which is turned to the photoconductive layer, is provided with a more conductive layer e.g. a thin lead or aluminum foil, a dispersion of a metal powder or of carbon powder in a binding agent, or a metal layer applied by deposition in a vacuum. Also fabrics consisting predominantly of carbon e.g. those marketed by Union Carbide Corporation, New York, N.Y., U.S.A. under the name Graphite Cloth Grade WCA, WCB and WCC, may successfully be used as conductive backings.

Fabrics and kinds of the paper which show insufficient conductivity at the prevailing air humidity, may also be used successfully, provided that the free-side of the backing is wetted before or during the development with a liquid having a resistivity lower than $10^6$ ohm cm.

The liquid material which is used for recording the conductivity image in a method according to the present invention is preferably a conductive polarisable liquid but other high dielectric constant liquids may be used.

Good results are obtained using developing liquids the electric resistivity of which is from 10 to $10^6$ ohm cm. As already stated the liquid material may be an emulsion or a solid/liquid dispersion.

According to a preferred feature of the invention, the liquid (hereafter called "the developing liquid") consists of at least 60% by weight of water. Very suitable developing liquids comprise a liquid vehicle, preferably water, and one or more of the following substances.

(I) Dyestuffs, inorganic pigments, colour couplers and bleaching agents: Suitable organic dyestuffs are e.g.:

Crystal Violet, C.I. 42,555
Malachite Green, C.I. 42,000
Methylene Blue, C.I. 52,015
Victoria Blue, C.I. 42,595 and C.I. 44,045
Carmine Red, C.I. 75,470
Nigrosine C 140 powder, C.I. 50,420
Chloramine Black EX (dark), C.I. 30,235
Rayon Black C (double conc.), C.I. 35,225
Chris Cuprofles 3 LB, C.I. Direct Black 63

Such dyestuffs are suitably used in water in an amount of from 0.3 to 20% by weight.

Suitable inorganic pigments are e.g.: any structural form of carbon e.g. graphite, carbon black, lamp black, bone black, charcoal; ultra-marine blue, cadmium sulphide, titanium dioxide, zinc oxide, iron oxide, magnetic or non-magnetic iron oxide, aluminium powder and bronze powder. Examples of suitable colourless or little coloured compounds which can be converted into a coloured compound, during or after wetting of the photoconductive or other material in the electric field, by reaction with a substance which is present in or on such material, are components of the following coupling reactions: the reactions described in United Kingdom patent specification No. 898,354; the reaction of diazonium compounds e.g. those described in the U.S. patent specification Nos. 2,306,471, 2,440,526, 2,451,331, 2,459,521, 2,461,892 and 2,493,963, with coupler compounds such as $\alpha$ or $\beta$-naphthol; the reaction of ferric salts with aromatic compounds containing hydroxyl groups e.g. pyrogallol and dodecyl gallate; the reaction of colourless triazolium and tetrazolium compounds such as those referred to in French patent specification Nos. 998,055 and 1,020,550 and in United Kingdom specification 670,883 with a reducing reaction compound; the clasical colour coupling reactions between oxidizable aromatic amino developers and colour couplers (see e.g. "The Theory of the Photographic Process" by C. E. Kenneth Mees, revised ed., 1954, The Macmillan Company, New York, pp. 584–589); the colour reactions set out by Feigl in "Spot Tests," 1954, Elsevier Publishing Corp., Amsterdam; the reaction of polyvinyl chloride with zinc oxide (this involves use of a solution or dispersion of the polyvinyl chloride in the liquid vehicle and warming).

Alternatively the liquid vehicle may include a component to cause bleaching out or de-colouring of a colour material in or on the material wetted by the liquid, or this material may incorporate the bleaching or decolouring component.

As and when required the developing liquid and/or the material wetted thereby may incorporate catalysts for promoting a colour forming or decolouring reaction.

It is possible to incorporate one of two colour-forming components in the developing liquid and the other component in the material on which the liquid deposits; or both of the reacting components may be incorporated in the liquid in cases in which the reaction requires a catalyst and in such a case the catalyst may be incorporated in the material on which the liquid deposits.

The formation of a visible record by a colour coupling reaction using one of the reacting components or a catalyst therefor in the material to which the liquid is supplied has the advantage that the formed image is well anchored and is very resistant to mechanical erasure.

(II) Substances influencing interfacial tension: Examples of substances which can be incorporated in the developing liquid for increasing the interfacial tension between the liquid and the surface which is selectively or differentially wetted are: potassium carbonate, aluminium sulphate, iron sulphate, cadmium chloride, magnesium sulphate. Further such substances are listed in "Taschenbuck für Chemiker und Physiker" by J. D'Ans and E. Lax, ed. 1949, Springer Verlag, p. 1008.

Examples of substances which may be incorporated for decreasing the interfacial tension are methanol, ethanol, acetone, methylethylketone, acetic acid, hydroquinone, lauryl sulphonates, dodecyl sulphonates, saponine and polyglycol derivatives, which compounds are water-miscible.

Other useful surface-active substances are those referred to in "Textilhilfsmittel und Washrohstoffe," by K. Lindner, Wiss. Verlagsgesellsch. m.b.H. Stuttgart, 1954.

The foregoing substances influencing surface tension may be used e.g. in a proportion of 0.2 to 20% by weight of the developing liquid.

(III) Substances for delaying drying of a dye: e.g. glycerol, glycol, sorbitol. Such substances can for example be used, where appropriate, in an amount of 0–10% by weight in the developing liquid.

(IV) Substances for making a dye more resistant to removal by water: e.g. gum arabic, carboxymethyl cellulose, casein, polyvinylpyrrolidine, polyacrylates, polystyrene, polyvinylacetate, waxes, silicates and colloidal silica. Such substances may be used in solution or dispersion, e.g. in an amount of 0 to 10% by weight of the developing liquid. (Other ways of rendering an ink more permanent are described by C. Ellis in "Printing Inks," Reinhold Publishing Corporation, New York (1940), p. 398.)

(V) Substances for increasing the electrical conductivity of the developing liquid: e.g. acids, salts, and bases which increase the concentration of hydrogen or hydroxyl ions or which introduce other ions with high mobility. Good results are obtained with mineral acids, sodium chloride, sodium bisulphate and potassium metabisulphite. Further examples are the ionisable substances for increasing the conductivity of an aqueous liquid cited in the above mentioned "Taschenbuch für Chemiker und Physiker," page 1225.

A suitable concentration of such substances in the developing liquid is from 0 to 5%.

(VI) Organic polar liquids with high dielectric constant: e.g., formamide.

Such liquids may be used in a concentration of, e.g., up to 35%.

Although up to now stress has been laid predominantly on very conductive developing liquids, the invention can be carried out using liquids with low resistivity (e.g., $\leq 10^6$ ohm cm.), provided a sufficient change of contact angle can be brought about by the presence of electrostatic charges. Accordingly other liquids which for the greater part comprise a highly polarisable substance can be used, e.g., liquids consisting for at least 60% of an organic liquid with high dielectric constant.

It will be appreciated that by appropriate choice of the colour relationship between the ground colour of a material which is selectively wetted on the one hand and of the developing liquid or dye formed in situ by means thereof on the other hand, direct positive images of documents can be formed irrespective of the direction of the electric current field. In the example of the invention described with reference to FIGURE 1, in which the backing of the photoconductive layer is connected to the positive side of the direct current source, a positive record is produced from a negative subject. It is possible to produce a direct positive, i.e., a positive record from a positive subject without reversing the polarity of the field by using a material 3 which has a dark or coloured surface and by using as the developing liquid a liquid which is of lighter colour or which reacts with a component of material 3 to bleach out its surface colour in the wetted areas. A photoconductive material incorporating a zinc oxide photoconductive layer may be given any desired surface colouration by the addition of sensitizing or other dyestuffs. Examples of lighter coloured developing liquids are dispersions of white or clear-coloured pigments, e.g., titanium oxide, zinc oxide, zinc sulphide, barium sulphate, antimony oxide, china clay and calcium carbonate.

In the specification of the earlier filed U.S. patent application No. 150,820 various techniques are described for utilising the pattern of liquid formed under the influence of the electrostatic charges, and records in terms of wetting liquid deposit produced according to the present invention may also be used in those tehniques. We mention here as one example the transfer of the liquid onto another support, e.g., by diffusion, to produce an image thereon by reaction of a component of the liquid with a component present in or on the further support or otherwise. Any such chemical reaction can be promoted by the use of catalysts and/or heat.

Various specific examples of methods according to the invention will now be given.

EXAMPLE 1

The following mixture is ground for 24 hr. in a ball-mill:

Blanc de Zinc, Neige Extra Pur, Type A (trade name) _____ kg__ 4.5
4% solution in ethanol of Flexbond D–13 (trade name for copoly(vinyl acetate/vinyl stearate) (85/15) marketed by Colton Chemical Company, Cleveland, Ohio, U.S.A.) _____ litres__ 9

While stirring, the following mixture is added to the dispersion so obtained:

4% solution in ethanol of Flexbond D–13 (trade name) _____ litres__ 21
10% solution in ethanol of monobutyl phosphate cc__ 300
10% solution in dimethyl formamide of succinic acid _____ cc__ 300
1% solution in ethanol of fluorescein _____ cc__ 300

This dispersion is knife-coated onto a glassine paper of 80 g./sq. m. in such a way that each litre covers 12 sq. m.

A negative microfilm image is projected with a projection lamp of 100 watt, placed at a distance of 65 cm. for 1 sec. onto the photo-conductive layer.

The obtained latent electron image is made visible by means of a device like that represented by FIG. 3, the two smooth conductive rollers being provided with connection plugs for the current source. The guiding roller 7 of the device is an aluminium roller with a diameter of 15 mm. and a length of 25 cm. Roller 6 is a chrome-nickel 18/8 steel roller having a diameter of 30 mm. and a length of 25 cm. This roller rotates freely in an ink container so that its surface is kept charged with ink. Roller 7 is connected to the positive pole and roller 6 to the negative pole of a direct-current source of 50 v.

The developing solution has the following composition:

Water _____ cc__ 100
Carbidschwarz E 300% (C.I. 30,235) _____ g__ 2

A positive copy of the negative microfilm image is obtained. Similar results are obtained if roller 6 is made of chrome-plated steel, copper, zinc or conductive rubber on a steel core.

EXAMPLE 2

The photoconductive layer has a composition analogous to that used in Example 1. It is coated on a baryta-coated paper support of 135 g./sq. m.

Exposure and development are carried out as in Example 1. The applied voltage, however, must amount to 110 v. in order to obtain a positive legible image.

EXAMPLE 3

A photoconductive layer with the same composition as in Example 1, but containing 120 cc. of a 1% solution in ethanol of Irisamine G (C.I. 45,210) instead of 300 cc. of a 1% solution in ethanol of fluorescein, is coated onto a glassine paper of 60 g./sq. m.

The photoconductive layer is exposed as in Example 1 and development is carried out as in that example save in that an alternating-current source of 50 v. and 50 cycles is used.

The developing solution has the following composition:

Water _____ cc__ 100
Noir Visco N (C.I. 35,255) _____ g__ 2
Ludox LS (trade name for a 30% aqueous dispersion of silica marketed by E. I. du Pont de Nemours & Co. (Inc.), Wilmington, Del., U.S.A.) _____ cc__ 20

A positive legible image is obtained.

By replacing Noir Visco N (C.I. 35,255) by Chlorantin Rot 8 BN (C.I. 23,050) or Brillant Benzo Echtgrun BL (C.I. 28,455) stable images in other colours are obtained.

EXAMPLE 4

A photoconductive material is composed as in Example 1. The photoconductive layer in contact with an original to be reproduced is reflectographically exposed for 1.5 sec. by means of an incandescent bulb of 75 watt placed at a distance of 10 cm.

The obtained latent electronimage is developed by means of the following composition:

Farbrusz S 170 (trade name for colloidal carbon marketed by Degussa, Frankfurt am Main, Germany) _____ g__ 10
Water _____ cc__ 110
Glycerin _____ cc__ 5
Ethanol _____ cc__ 5
1% aqueous solution of the sodium salt of carboxymethyl cellulose _____ cc__ 50
4.5% aqueous solution of Tergitol Anionic 4 (trade name for a plasticizer marketed by Union Carbide Corporation, New York, N.Y., U.S.A.) ____ cc__ 20

The development is carried out in a device comprising two smooth rollers like that shown in FIG. 3. Roller 7 is connected to the negative pole and roller 6 to the positive pole of a direct-current source of 200 v.

Immediately after development the wet-image is transferred to ordinary paper and a legible positive image is obtained.

By replacing Noir Visco N (C.I. 35,255) by Chlorantin Rot 8 BN (C.I. 23,050), Brillant Benzo Echtgrun BL (C.I. 28,455) stable images in other colours are obtained.

EXAMPLE 5

The following mixture is ground for 4 hr. in a ball-mill:

4% solution of Vinnapas UW 10 (trade name for a polyvinyl acetate marketed by Wacker-Chemie G.m.b.H.; Munchen, Germany) in a mixture of methylene chloride and ethanol (25/75) ___ cc__ 100
Zinc oxide of Example 1 _____ g__ 30
10% solution of monobutyl phosphate in ethanol cc__ 2

Thereupon a 1% solution in ethanol of tetrabromofluorescein (Eosine) (C.I. 45,380) is added to the obtained homogeneous dispersion.

The photoconductive dispersion is dip-coated onto a baryta-coated paper support of 90 g./sq. m. in such a way that the dry layer contains 14 g. of zinc oxide per sq. m. The coated layer is dried by means of air at 60° C.

Exposure and development are carried out as in Example 1 the exposure time, however, being 5 sec. The developing solution is also that of Example 1. A direct-current voltage of 220 v. is applied between the guiding roller and the inking roller.

A positive image of the negative microfilm image to be reproduced is obtained.

EXAMPLE 6

The following mixture is ground for 24 hr. in a ball-mill:

Zinc oxide of Example 1 _____kg__ 4.5
4% solution in ethanol of Flexbond D–13 (trade name) _____litres__ 9
10% solution in ethanol of monobutyl phosphate cc__ 300

After grinding, the following mixture is added to the obtained dispersion while stirring:

4% solution in ethanol of Flexbond D–13 (trade name) _____litres__ 21
10% solution in dimethyl formamide of succinic acid cc__ 300
1% solution in ethanol of Rhodamine B (C.I. 45,170) cc__ 300

This dispersion is knife-coated onto the aluminium layer of a paper support coated with aluminium, in such a way that each litre covers 10 sq. m.

The obtained photoconductive layer when dry is exposed through a negative for 0.8 sec. by means of an incandescent bulb of 75 watt placed at a distance of 10 cm.

Development of the formed latent electron images takes place with a device as represented by FIG. 3. Roller 6 is a chromium-nickel 18/8 steel roller and roller 7 is an aluminum roller.

The exposed photoconductive material is led between the two rollers at a speed of 3 m./min., the photoconductive layer being in contact with the liquid film on roller 6. From the moment the photoconductive material is led between the two rollers, roller 7 is connected with the positive pole and roller 10 with the negative pole of a direct-current source of 20 v.

The developing solution has the following composition:

Cc.
Aquablack U (trade name) _____ 10
Water _____ 100

A positive image of the negative is obtained.

EXAMPLE 7

A photoconductive material as described in Example 1 is exposed through a negative. The rear side, i.e., the free paper support layer, of the material, is wetted with water, but a small margin thereof is kept dry. The exposed photoconductive layer is contacted by dipping for 1 second with a 2% aqueous methylene blue solution used as developing ink, care being taken however that a small margin of the photoconductive layer is also kept dry. During said dipping the photoconductive material is traversed by an electric field by connecting the wetted free side of the paper support to the positive side and connecting the developing ink into which the photoconductive layer is dipped to the negative side of a source of electrical potential of 50 v. By keeping a margin of the photoconductive material out of the liquid, short-circuiting of the field is prevented. A positive image is obtained by selective wetting of the parts of the photoconductive layer which were exposed to light.

EXAMPLE 8

A photoconductive composition is prepared by mixing:

Zinc oxide (Neige Extra Pure, Type A) _____g__ 37.5
Copoly (vinyl acetate/vinyl laurate) (80/20) __g__ 10
Ethanol _____cc__ 133

This suspension is coated onto baryta-coated paper of 80 g. per sq. m. After drying, the thickness of the photoconductive layer amounts to 25μ. This photoconductive layer is exposed for 1 min. in contact with a negative original with an incandescent lamp of 75 w.–110 v. placed at a distance of 10 cm.

Development is carried out with a 2% aqueous solution of Nigrosine (C.I. 50,420) by means of the apparatus described in Example 1. Between the smooth rollers, however, a potential of 100 v. is applied. The guiding roller is connected to the positive pole and the inking roller to the negative pole. The smooth inking roller is manufactured from chrome-nickel 18/8 steel and possesses a diameter of 25 mm. The travelling rate of the exposed material is 1 m. per min. A positive legible image of the original is obtained.

EXAMPLE 9

A photoconductive composition is prepared by mixing:

Zinc oxide (Neige Extra Pure, Type A) _____g__ 15
Copoly (vinyl acetate/vinyl stearate (85/15)__g__ 4
Methanol _____cc__ 100
Succinic acid _____g__ 0.1

This composition is coated onto a baryta-coated paper of 80 g. per sq. m. After drying, the thickness of the photo-conductive layer amounts to 22μ. The surface of this layer, even without electrostatic charges, forms with water a contact angle of less than 90° and is as such not very suitable for development by non-differentially supplying an aqueous developing ink to said surface. The photoconductive layer is therefore made more hydrophobic by exposure during 1 minute to trichloroethylene vapors.

Exposure and development proceed as described in Example 8, the electrical potential however, being 450 v. A clear positive image is obtained.

EXAMPLE 10

A photoconductive composition is prepared by mixing:

Zinc oxide (Neige Extra Pure, Type A) _____g__ 15
Copoly (vinyl acetate/vinyl stearate (85/15)__g__ 4
Methanol _____cc__ 100
Monobutyl phosphate _____g__ 0.1

This composition is coated onto a baryta-coated paper of 80 g. per sq. m. After drying, the thickness of the photoconductive layer amounts to 26μ. The surface of this layer, even without electrostatic charges, forms with water a contact angle of less than 90° and as such does not permit a good development by non-differential supply of an aqueous developing ink to the said surface. The photoconductive layer is therefore made more hydrophobic by exposure during 1 minute to trichloroethylene vapors.

Exposure and development proceed as described in Example 8, the potential applied, however, being 450 v.

EXAMPLE 11

A photoconductive composition is prepared by mixing:

Zinc oxide (Neige Extra Pure, Type A) _____g__ 15
Copoly (vinyl acetate/vinyl stearate (85/15)__g__ 4
Methanol _____cc__ 100
Succinic acid _____g__ 0.1
Monobutyl phosphate _____g__ 0.1

This composition is coated onto a baryta-coated paper of 80 g. per sq. m. After drying, the thickness of the photoconductive layer amounts to 25μ.

The exposure proceeds as described in Example 8.

Development is carried out by using a developing device as shown in FIG. 3. The conductive inking roller having a diameter of 25 mm. rotates at a speed of 20 r.p.m. The exposed photoconductive material travels at a speed of 3 m./min. between the conductive inking roller and the conductive guiding roller, while a potential difference of 250 v. is applied between them, the inking roller 6 being connected to the negative pole and the guiding roller 7 to the positive pole of a direct-current source. A very clear positive image is obtained.

EXAMPLE 12

If in the photoconductive composition of any of the foregoing examples 0.6% of the fluorescent compound p-dimethylamino cinnamic acid is incorporated, based on the weight of zinc oxide, and if as developing solution a 2% aqueous solution of methylene blue is used, an ink image is obtained which after drying is water-resistant.

EXAMPLE 13

A photoconductive composition as described in Example 1, is coated on a parchment paper base of 70 g./sq. m. in such a way that each litre covers 12 sq. m. The exposure is made in contact through a diapositive for 6 sec. with a lamp of 75 w.–110 v. placed at a distance of 10 cm.

Development is carried out with a 2% aqueous solution of methylene blue and in an apparatus similar to that shown by FIG. 3 but using a conductive aluminium guiding roller 7 with a diameter of 30 mm. and a nonconductive helically grooved inking roller 6 with a diameter of 30 mm. made from polyvinyl chloride. The groove is of V-section with a depth of 0.2 mm. and its side walls diverging at an angle of 60°. The adjacent convolutions of the groove are juxtaposed so that the side walls of the portions of the groove in neighbouring convolutions meet at the roller surface to define inverted V-shaped crest portions with an apex angle of 60°.

During development an electrical potential obtains between an electrode immersed in the developing liquid and the conductive guiding roller 7. The grooved inking roller freely rotates in the ink container. Roller 6 is rotated at a speed of 100 r.p.m. so that a liquid bead is formed between the exposed photo-conductive layer and the inking roller.

The electrical potential during development amounts to 200 v., the guiding roller being connected to the negative pole and the immersed electrode to the positive pole of a direct-current source. A positive image is obtained by selective wetting of the photoconductive layer.

EXAMPLE 14

The following mixture is ground for 24 hrs. in a ball-mill:

Blanc de Zinc, Neige Extra Pur, Type A (trade name) _____kg__ 4.5
4% solution in ethanol of Flexbond D–13 (trade name for copoly(vinyl acetate/vinyl stearate) (85/15) marketed by Colton Chemical Company, Cleveland, Ohio, U.S.A.) _____l__ 9

While stirring, the following mixture is added to the obtained dispersion:

4% solution in ethanol of Flexbond D–13 (trade name) _____litres__ 21
10% solution in ethanol of monobutyl phosphate cm.$^3$__ 300
10% solution of dimethyl formamide of succinic acid _____cm.$^3$__ 300
1% solution of ethanol of fluorescein _____cm.$^3$__ 300

This dispersion is knife-coated onto a baryta-coated paper support having a surface resistivity of $10^8$ ohm cm. in such a way that each litre covers 10 sq. m.

An image is episcopically projected for 30 sec. onto the dry photoconductive layer by means of a camera (the subject being a positive printed record), using 8 incandescent bulbs of 100 watt, placed at a distance of 25 cm. of the original, and a Schneider Kreuznach Xenar 4.4 lens with a focal distance of 21 cm. and set at a diaphragm aperture of 5.6. The total distance from the original via the mirror and the lens to the photoconductive material is 84 cm.

The development of the latent electron image is carried out in a device schematically represented by FIG. 3. The device essentially consists of two conductive rollers with connection plugs for the current source and an ink container. Roller 7 is an aluminium cylinder with a diameter of 15 mm. and a length of 25 cm., which accomplishes the function of guiding roller for the material to be developed. Roller 6 is a chromium-nickel 18/8 steel roller having a diameter of 30 mm. and a length of 25 cm. The surface of this roller is helically grooved, the groove being of V-section in such a way that the neighbouring convolutions of the groove are in immediate proximity. The groove has a width and a depth of 0.5 mm. This roller rotates freely in the ink container so that the groove is filled with ink. The ink is retained herein by capillary forces.

The photoconductive material is led between the two rollers at a speed of 3 m./mm. and has the zinc oxide layer being in contact with the grooved roller.

From the moment the photoconductive material which carries the latent electron image is led between the two rollers a direct-current voltage of 400 v. is applied between the rollers by connecting roller 7 to the negative pole and roller 6 to the positive pole of a direct-current source.

The developing solution has the following composition:

Aquablack U (trade name for a 15% aqueous dispersion of colloidal carbon marketed by Columbian Carbon Company, New York, N.Y., U.S.A) cm.$^3$__ 10
Water _____cm.$^3$__ 100

A positive legible image of the original is obtained on the unexposed areas by selective wetting.

An image of still greater resolution is obtained when slightly wetting the back side of the photoconductive material before development.

Analogous results are obtained with a photoconductive layer containing Vinnapas B 100/20 VL (trade name for a polyvinyl acetate marketed by Wacker-Chemie G.m.b.H. Munchen, Germany) instead of Flexbond D–13 (trade name).

Good results are also obtained when replacing Blanc de Zinc Neige Extra Pur type A (trade name) by Zinc Oxide Standard Gold Seal (trade name).

Finally, equal results are achieved if roller 6 is made from copper, zinc or chrome-plated steel.

EXAMPLE 15

A photoconductive composition is used which is the same as in Example 14 save in that 120 cm.$^3$ of a 1% solution in ethanol of Rose Bengale N (C.I. 45,440) are used instead of 300 cm.$^3$ of a 1% solution in ethanol of fluorescein, and save in that 300 cm.$^3$ of a 10% solution in dimethyl formamide of 2,5-diethoxy-4-benzylamino benzene diazonium chlorozincate are added. After grinding the mixture it is coated onto a baryta coated paper support of 90 g./sq. m.

The dry photoconductive layer is exposed through a negative film image for 0.7 sec. by means of an incandescent bulb of 75 watt placed at a distance of 10 cm. The exposed photoconductive material is led between the two rollers of a developing device as described in Example 14 at a speed of 3 m./min., the photoconductive layer being against the grooved inking roller 6 whereas the support which is slightly wetted with water is in contact with roller 7. During development, roller 7 is connected to the positive pole and roller 6 to the negative pole of a direct-current source of 220 v.

The following developing solution is used:

Water _____cm.$^3$__ 100
α-Naphthol _____g__ 1
Sodium hydroxide _____g__ 1

By the image-wise wetting on the unexposed areas and by the coupling of the α-naphthol with the 2,5-diethoxy-4-benzoylamino benzene diazonium chlorozincate, a positive dye image of the negative film image is obtained.

EXAMPLE 16

A photoconductive zinc oxide containing layer, prepared as described in Example 14, is exposed for 6 sec. in contact with a transparency to a lamp of 75 w.–110 v. placed at a distance of 10 cm.

Development of the formed latent electron image is carried out by means of a device as schematically represented in FIG. 3. The device consists essentially of two conductive rollers and an ink container.

Roller 7 is an aluminium cylinder having a diameter of 15 mm. and a length of 25 cm. and acts as guiding roller for the material to be developed. Roller 6 is a copper cylinder having a diameter of 25 mm. and a length of 25 cm. and act as ink-roller. The surface of this roller is helically grooved. The groove possesses V-shape of a depth of 0.5 mm. and a top angle of 60°. The roller rotates freely in the ink container, so that the grooves are filled with ink and the edges of the grooves are wetted. The ink is retained in the grooves by capillary forces.

The exposed photoconductive material is laid with the photoconductive layer onto the inked grooved roller so that the liquid on the edges of the groove comes in contact with the photoconductive layer. The photoconductive layer is led between the two rollers at a speed of 3 m. per minute.

During development a tension of 450 v. is applied between the two rollers, the roller 7 being connected to the negative pole and roller 6 to the positive pole of a direct-current source. The developing solution consists of an aqueous solution of 2% of methylene blue.

By selective wetting, a legible positive image of the original is obtained on the unexposed areas. When a tension of 400 v. is applied the image is uncompletely reproduced, whereas on using a tension of 600 v. a still legible image is obtained, the exposed areas of which, however, being also moistened with ink but not in a so high degree as the unexposed areas.

Other developing rollers provided with mostly varying capillary grooves or apertures can also be used and give similar results.

So, by replacing the above described copper roller by a copper roller with a V-shaped groove of 0.2 mm. depth and having a top angle of 60° similar results are obtained. The required tension for obtaining satisfactory results with this roller amounts only to 250 v. A suitable image quality is obtained within the tension limits of 230 and 350 v.

Good results are also obtained with rollers possessing screened surfaces having per cm. 20 sharp pyramid-shaped cavities of 0.193 mm. depth and screened surfaces having per cm. 18 obtuse pyramid-shaped cavities of 0.172 mm. depth.

Rollers with such surfaces can be applied with the tensions given above. According as the depth of the screen cavities increases, the tension should be raised.

Still other suitable screen surfaces for inking rollers for being applied in a process according to this invention, are described in the catalogue of A. E. Ungricht, Monchen-Gladbach, Oststrasse 8–12, Germany.

EXAMPLE 17

The photoconductive layer is composed as described in Example 14, but is applied on a glassine paper support of 60 g./sq. m. Onto this layer a microfilm text negative is projected for 1 sec. with a lamp of 100 w. placed at a distance of 65 cm. The development by selective wetting is carried out by means of the first device described in Example 16, the positive pole of the direct current source being connected to roller 7 and the negative pole to roller 6. The developing solution consists of a 2% aqueous solution of Carbicschwarz E 300% (C.I. 30,235).

The exposed photoconductive layer is led at a rate of 2.5 m./min. between the rollers. The required tension amounts to 50 v. A positive copy of the original is obtained. When using a tension of 40 v., the text is not always completely reproduced, whereas with a tension of 100 v. a still usuable although less clean copy is obtained.

When the copper cylinder 6 is replaced by a chrome-nickel 18/8 steel cylinder having the same groove dimensions, the potential difference and the developing rate remaining the same, the quality of the developed images remains unaltered.

EXAMPLE 18

A photoconductive composition as described in Example 14 is coated in such a way onto baryta-coated paper of 90 g. per sq. m., that each litre of this composition covers 10 sq. m. of paper. The paper support possesses a resistivity of about $10^9$ ohm cm.

As in Example 15, a negative microfilm image is projected onto the photoconductive layer. Development of the formed latent image is carried out by means of the development device described in Example 16, the first described grooved copper roller, however, being replaced by a chromium-nickel 18/8 steel roller grooved in the same way.

During development an alternate tension of 220 v.–50 cycles is applied between the two rollers. The exposed photoconductive layer is led between the rollers at a rate of 2 m./min. As developing solution a 2% aqueous solution of methylene blue is used.

A positive legible image is obtained. A slight moistening of the non-exposed areas by application of a tension of 300 v., is avoided by raising the frequency. Increase of the frequnecy till 5000 cycles involves the complete disappearance of the image.

EXAMPLE 19

Exposure and development are the same as described in Example 16, the developing liquid, however, being water. Onto the obtained water image, a mixture of iron particles and a toner employed in xerographic powder development is poured in cascade. The used toner is positively charged. It adheres only to the still wet image areas. After thermal fixing by melting the deposited toner particles, a high-contrasty image possessing a very pure background is obtained.

EXAMPLE 20

A photoconductive composition as described in Example 14, is coated on a parchment paper base of 70 g./sq. m. in such a way that each litre covers 12 sq. m. The exposure is made in contact through a diapositive for 6 sec. with a lamp of 75 w.–110 v. placed at a distance of 10 cm.

Development is carried out by means of a development device comprising a guiding roller, and an inking roller as shown in FIG. 3. The guiding roller is the same as described in Example 16. The inking roller, however, is not conductive and made from polyvinyl chloride. It has a diameter of 30 mm., rotates at 25 r.p.m. and is helically grooved.

The groove has a depth of 0.2 mm. and a top angle of 60°. The tension between the developing liquid and the conductive guiding roller is applied with an electrode which is immerged in the developing liquid. The tops of the surface profile are cleaned with a sponge or blotting paper on a roller before contacting the exposed photoconductive layer. The required tension for development amounts to 300 v., the guiding roller being connected to the negative pole and the immerged electrode to the positive pole of a direct-current source. A positive image is obtained.

The conductive developing solution is a 2% aqueous solution of methylene blue.

In this example also a conductive polyvinyl chloride roller can be used. In this case the rollers act as electrodes. Conductive polyvinyl chloride is manufactured e.g. by "Abbey Plastics Corporation," Hudson, Mass., U.S.A.

EXAMPLE 21

A photoconductive composition as described in Example 14, is knife-coated onto glassine paper of 80 g./sq. m. in such a way that each litre covers 12 sq. m.

A negative microfilm image is projected for 1 sec. onto the photoconductive layer with a lamp of 100 watt, placed at a distance of 65 cm.

Development is carried out by means of a development device comprising a guiding roller and an inking roller. The guiding roller is the same as described in Example 16. The inking roller, however, is not conductive and made from polyvinyl chloride. It has a diameter of 30 mm., rotates at 25 r.p.m. and is helically grooved. The groove has a depth of 0.2 mm. and a top angle of 60°. The grooved inking roller freely rotates in an ink container filled with a 2% aqueous solution of Carbidschwarz E 300% (C.I. 30,235).

The tops of the surface profile are cleaned with a sponge which is in continuous contact with the grooved roller. The sponge secures a uniform filling of the capillaries. This uniform filling is required in order to keep the tension constant during development.

The exposed photoconductive material is led between the guiding roller and the inked grooved roller whereby the exposed photoconductive layer comes in contact with the clean tops of the grooved roller. On moving the photoconductive material between the rollers a direct-current tension of 300 v. is applied between the conductive guiding roller and an electrode immerged in the ink container. The positive pole of the direct-current source is connected to the conductive guiding roller and the negative pole to the imerged electrode. A positive copy of the original is obtained. Satisfactory results are obtained with a direct-current potential ranging between 250 v. and 350 v.

EXAMPLE 22

A photoconductive composition is prepared by mixing:

Zinc oxide (Neige Extra Pure, Type A) _____g__ 37.5
Copoly(vinyl acetate/vinyl laurate) (80/20) __g__ 10
Ethanol _____cm.$^3$__ 133

This composition is coated onto baryta-coated paper of 80 g. per sq. m. After drying, the thickness of the photoconductive layer amounts to 25μ. The photoconductive layer is exposed for 1 minute in contact with a negative original with an incandescent lamp of 75 w.–110 v. placed at a distance of 10 cm. Developing is carried out as described in Example 20 using a non-conductive helically grooved polyvinyl chloride inking roller. As developing ink a 2% aqueous solution of Nigrosine (C.I. 50,420) is used. The grooved polyvinyl chloride roller with clean tops rotates at 25 r.p.m. By connecting the guiding roller to the positive pole and an electrode immerged in the developing liquid to the negative pole of a 300 v. direct-current source a positive legible image is obtained.

EXAMPLE 23

A photoconductive composition is prepared by mixing:

Zinc oxide (Neige Extra Pure, Type A) _____g__ 15
Copoly(vinyl acetate/vinyl stearate) (85/15) __g__ 4
Methanol _____cm.$^3$__ 100
Succinic acid _____g__ 0.1

This composition is coated onto baryta-coated paper of 80 g. per sq. m. After drying, the thickness of the photoconductive layer amounts to 22μ. This layer forms with water a contact angle of less than 90° and as such is not suitable for development with a grooved roller, the tops of which are wetted with an aqueous developing liquid. The photoconductive layer is made more hydrophobic by exposing it for 1 minute to trichloroethylene vapors.

Exposure to light and development proceed as described in Example 22, the applied tension for obtaining an ink image, however, being 700 v.

EXAMPLE 24

A photoconductive composition is prepared by mixing:

Zinc oxide (Neige Extra Pure, Type A) _____g__ 15
Copoly(vinyl acetate/vinyl stearate) (85/15) __g__ 4
Methanol _____cm.$^3$__ 100
Monobutyl phosphate _____g__ 0.1

This composition is coated onto baryta-coated paper of 80 g. per sq. m. After drying, the thickness of the photoconductive layer amounts to 26μ. This layer forms with water a contact angle of less than 90° and as such is not suitable for development with a grooved roller the tops of which are wetted with an aqueous developing liquid. The photoconductive layer is made more hydrophobic by exposing it for 1 minute to trichloroethylene vapors. Exposure to light and development proceed as described in Example 22, the tension for obtaining an ink image, however, being 700 v.

EXAMPLE 25

A photoconductive composition is prepared by mixing:

Zinc oxide (Neige Extra Pure, Type A) _____g__ 15
Copoly(vinyl acetate/vinyl stearate) (85/15) __g__ 4
Methanol _____cm.$^3$__ 100
Succinic acid _____g__ 0.1
Monobutyl phosphate _____g__ 0.1

This composition is coated onto baryta-coated paper of 80 g. per sq. m. After drying, the thickness of the photoconductive layer amounts to 25μ. The exposure and development proceed as described in Example 22, the applied tension for obtaining an ink image, however, being 400 v.

We claim:

1. A process of reproduction using an electrophotographic material including a photoconductive insulating layer, and an electrically conductive backing for said layer, which process comprises exposing said layer with light to a pattern to be reproduced to produce in said layer a latent photoconductive image according to said pattern; bringing said layer into close proximity to a dispensing member for an aqueous conductive developing liquid for said latent image, said dispensing member including at least one capillary channel for receiving said liquid and applying same to the image-carrying area of the layer to be developed, each such capillary channel opening towards the layer and having walls which are hydrophilic relative to said liquid whereby said liquid is normally held therein at least substantially out of contact with the proximate layer surface by capillary forces, said photoconductive insulating layer having a surface normally hydrophobic relative to said developing liquid; and while said layer and dispensing member are in such close proximity but not prior to concurrently with said exposure step and not later than the period of persistent conductivity of said exposed layer, traversing said material with an electric field extending between said electrically conductive backing and said conductive developing liquid and passing through said exposed layer to transform the photoconductive image therein into an electrostatic charge pattern, the intensity and duration of said electric field being sufficient to overcome both said capillary forces holding the developing liquid in said channel and the normal repellency of the layer surface for said liquid and thus bring said liquid into wetting contact with the electrostatically charged areas of said layer to develop the same.

2. The process of claim 1, wherein said electric field is a direct current electric field.

3. The process of claim 2, wherein said electric field is created by connecting said backing and said conductive liquid to the respective poles of an alternating current voltage potential having a frequency of 50 c./s. to 5 kc./s., said A.C. current being rectified by said zinc oxide containing photoconductive layer.

4. The process of claim 1, wherein said photoconductive layer contains photoconductive zinc oxide powder as the essential photoconductive material.

5. The process of claim 1 wherein said developing liquid is comprised by at least 60% by weight of water.

6. The process of claim 1 wherein said developing liquid has a specific resistivity lower than $10^6$ ohm cm.

7. The process of claim 1 wherein said electric field is created by an alternating current voltage potential having a frequency of 50 c./s. to 5 kc./s.

8. The process of claim 1 wherein said photoconductive layer comprises a photoconductive zinc oxide powder and a binder material for said powder, said binder material comprising at least one polyvinyl ester.

9. The process of claim 8 wherein said electric field is created by an alternating current voltage potential having a frequency of 50 c./s. to 5 kc./s.

10. The process of claim 8, wherein said electric field is created by connecting said backing and said conductive liquid to the respective poles of an alternating current voltage potential having a frequency of 50 c./s. to 5 kc./s., said A.C. current being rectified by said zinc oxide containing photoconductive layer.

References Cited

UNITED STATES PATENTS

| | | | |
|---|---|---|---|
| 3,053,179 | 9/1962 | Reithel | 117—37 X |
| 3,084,043 | 4/1963 | Gundlach | 96—1 |
| 3,121,006 | 2/1964 | Middleton et al. | 96—1.5 |

NORMAN G. TORCHIN, *Primary Examiner.*

C. E. VAN HORN, *Assistant Examiner.*

U.S. Cl. X.R.

117—37